United States Patent [19]

Beck

[11] 4,061,188
[45] Dec. 6, 1977

[54] FAN SHROUD STRUCTURE

[75] Inventor: Harold D. Beck, Downers Grove, Ill.

[73] Assignee: International Harvester Company, Chicago, Ill.

[21] Appl. No.: 668,355

[22] Filed: Mar. 19, 1976

Related U.S. Application Data

[63] Continuation of Ser. No. 543,714, Jan. 24, 1975, abandoned, and Ser. No. 470,787, May 17, 1974, abandoned.

[51] Int. Cl.² .................... F28F 13/06; F01P 7/10; F03D 11/00
[52] U.S. Cl. .................... 165/122; 123/41.49; 415/207; 415/210; 415/219 R; 415/DIG. 1
[58] Field of Search ......... 415/207, 209, 210, DIG. 1, 415/219; 123/41.49; 165/51, 122

[56] References Cited

U.S. PATENT DOCUMENTS

| | | | |
|---|---|---|---|
| 2,202,790 | 5/1940 | Forrest | 415/209 X |
| 3,144,857 | 8/1964 | Walton | 415/210 X |
| 3,433,403 | 3/1969 | Gerlitz | 415/210 X |
| 3,620,640 | 11/1971 | Soulez-Lariviere | 415/DIG. 1 |
| 3,677,660 | 7/1972 | Taniouchi et al. | 415/DIG. 1 |
| 3,814,538 | 6/1974 | Stoquist | 415/DIG. 1 |
| 3,832,085 | 8/1974 | De Fauw et al. | 415/210 X |
| 3,893,787 | 7/1975 | Jones | 415/DIG. 1 |

OTHER PUBLICATIONS

Applications of the Coanda Effect, Imants Reba, Science American, (vol. 214, No. 6, 6-66, pp. 84-92).

Primary Examiner—Charles J. Myhre
Assistant Examiner—Sheldon Richter
Attorney, Agent, or Firm—Frederick D. Kiubel; Floyd B. Harman

[57] ABSTRACT

A contoured shroud exit having means capable of producing low pressure vortices when a fan generated air stream is expelled therefrom.

16 Claims, 4 Drawing Figures

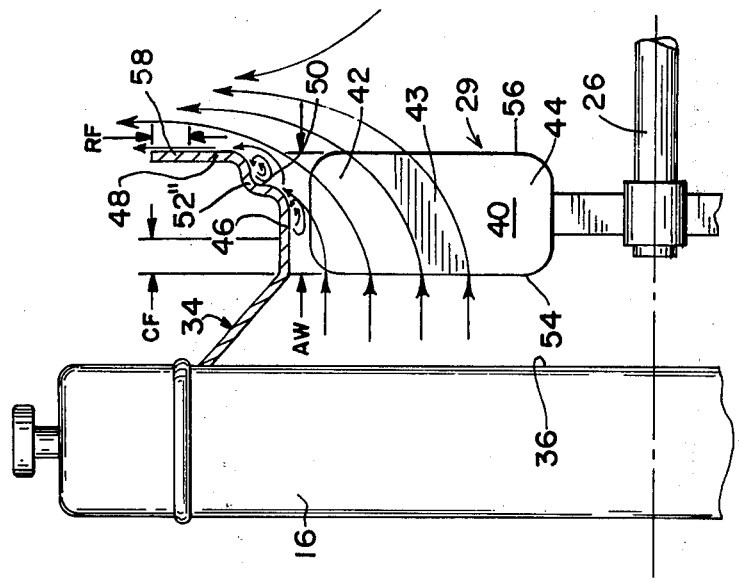
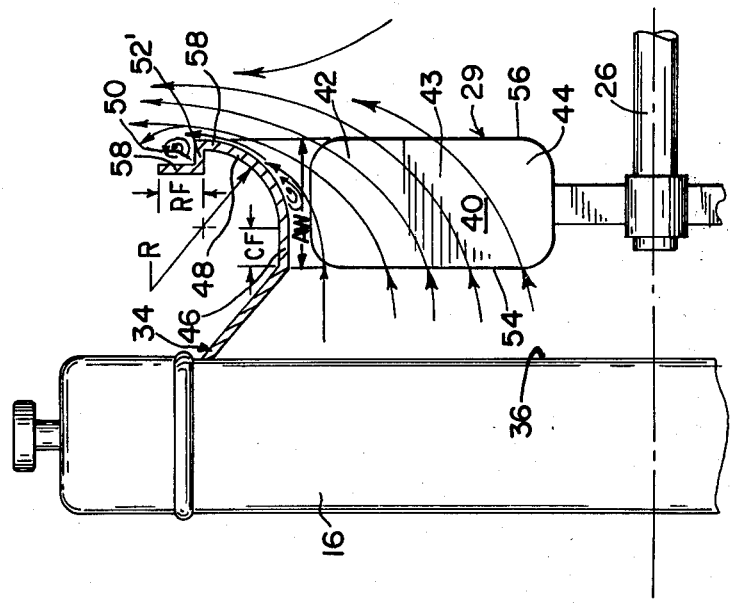

Located at the forward end of engine 10 is a fan shaft means 26 whereby power is delivered to drive as fan 29. As is apparent, the particular mode whereby power is transferred to the fan and its particular location in regard to the engine 10 is not critical with respect to the engine 10, and any desired location would be satisfactory and any means of powering could be employed without departing from the spirit and scope of the invention. The fan 29 herein depicted is a rotatable suction type fan positioned adjacent the radiator 16 and normally creates a flow of air or, more particularly, moves a stream of cooling air through the radiator 16 with a subsequent discharge thereof around fan exit shroud section 28 when in operation. The fan generated air stream is guided or directed from the radiator 16 to the fan 29 by means of a fan shroud means, designated generally by reference character 32. The particular shape of the axially forward or entrance section 34 of the fan shroud means 32 is dependent upon the shape and design of the rear or air exit face 36 of the radiator 16. The nature of the connection between the forwardmost edge of the fan shroud means 32 and the rear face 36 of the radiator 16 would depend upon the particular characteristics of the assembly. That is, some connections being provided with air gaps, others are made flexible while in still other situations the entire area between the two components is sealed over the entire periphery of the enclosure. In the preferred form of this invention the entire rear face area of the radiator 16 is substantially sealed against the passage of air from any other direction except through the radiator 16. From the forwardmost edge of the entrance shroud section 34 the shroud (be it a tapered transition as shown or a box type), the entrance shroud section 34 converges axially rearwardly and radially inwardly as indicated by reference numeral 38.

Referring now to FIG. 2 wherein is shown an embodiment of a Coanda effect producing shroud exit, section 28. The critical feature of the shroud exit section 28 is its ability to form a bubble, vortex, or a region of low pressure adjacent the surface parallel to which it is desired to bend the air stream. Fan circumferentially spaced, radially extending 29 includes a plurality of fan blades 40 (only one as shown here) as is well known in the art. Each of the fan impeller blade 40 can be divided radially into an end or tip region 42, a hub region 44 and a middle region 43. It is believed that with a standard venturi type shroud and fan arrangement substantial turbulence is created in the tip region 42 such that a relatively high level of noise is created and the air moving ability of that region is substantially impaired. In the hub regions difficulty with the drawing in of air from the rear (rather than through the radiator 16) with subsequent recirculation substantially impairs the air moving ability of that portion of the fan 16. As a result only the middle region or portion 43 of the fan 16 is performing an efficient air moving job. It is believed at this time for reasons unknown that the provision of a Coanada generating fan shroud exit section generally encircling the fan blades 40 somehow reduces turbulence and improves the overall air moving efficiency of the blade.

The improved efficiency, that is, the lower horsepower requirement to achieve a given cooling rate and the reduced noise generated in the fan blade tip regions result from the employment of the Coanda generating fan shroud exit section 28. It is known from experimentation with a high speed air jet issuing from a nozzle adjacent a Coanda effect producing surface that up to twenty times the volume of air in the jet will be entrained thereby, from the ambient air mass that is on the side of the jet opposite the surface. It may be that this entrainment phenomenon is helping to pull additional air through the fan blades 40. As air passes through the blades 40 it is immediately entrained by the stream adjacent the Coanda effect producing shroud exit section 28.

It has been determined by experimentation that a vortex forms a region of low pressure which can be created when a high speed air jet is directed over a properly designed curved surface. See for example my co-pending application Ser. No. 348,436, now U.S. Pat. No. 3,872,916. It has also been determined that supplementary low pressure regions can be created by a step or groove in the adjacent surface toward which the airstream is bent. In an article entitled "Applications of the Coanda Effect" by Imants Reba, Scientific American, June 1966, the provision of steps near the jet exit to generate the Coanda effect is demonstrated. It should also be noted that the author admits that the Coanda effect is not fully understood and the simple provision of a step will probably not suffice to create a Coanda effect. In FIGS. 2, 3, and 4, it is believed that shroud exit section designs have been provided wherein vortices are formed. It must also be understood that the position of the fan blade assembly with regard to the shroud exit contributes the formation of the Coanda effect. The embodiments as shown in FIGS. 2, 3, and 4 combine smooth curved surfaces and indentations to achieve the Coanda effect in combination with the fan blades 40. That is, a fan shroud exit section 28 capable of producing the Coanda effect will be one having a low pressure vortex creating means such that when an air stream is passed thereover the ambient pressure on the side of the stream away from the shroud stream causes it to deviate and "follow" the surface of the shroud exit section.

Referring specifically now to the embodiment shown in FIG. 2, the Coanda effect producing shroud exit section 28 extending axially from the rearwardmost edge of the shroud entrance section 38 of shroud means section 32 is the Coanda effect producing shroud exit section 28. Included in the exit shroud section 28 is a generally cylindrical, axially extending throat section 46, and having an axial length CF, a radially expanding smooth annular curved section 48, having a radius of curvature R with a low pressure forming supplementary vortex creating means 50 taking the form here of a radial step or offset 52; between the two mentioned sections. Generally centrally located within exit shroud section 28 is the fan 29. It should be noted that throat section 46 is substantially sealed to the shroud entrance section 34 section of shroud means 32 and in the preferred embodiment forms a complete circle around the fan 29. The radial step or offset 52 extends radially from the rearwardmost edge of the throat section 46 to the forwardmost edge of the curved section 48 to thus provide an annular low pressure vortex creating means 50. Smooth curved section 48 generally expands radially outwardly or in the direction in which it is desirous of directing the exit airstream passing thereover. A radially expanding section 58, in effect, forms a radial continuation of the rearwardmost edge of the curved section 48 and extends radially from such edge a distance RF.

As pointed out hereinbefore, one of the prime objects of the present invention is to reduce the operating noise

FAN SHROUD STRUCTURE

This is a continuation of application Ser. No. 543,714, filed Jan. 24, 1975, now abandoned, which is a continuation of Ser. No. 470,787, filed May 17, 1974, now abandoned.

This invention relates to cooling systems for internal combustion engines and, more particularly, to a Coanada effect producing fan shroud exit, involved in the air handling step of the heat transfer process.

Reference should be made to my co-pending application Ser. No. 348,436, now U.S. Pat. No. 3,872,916, issued Mar. 25, 1975.

A standard mode of removing heat from an internal combustion engine is to transfer the heat to a liquid coolant, often water or a mixture thereof, and from there to a stream of air, the heated air being dispersed out into the atmosphere. A substantial body of art exists in the provision of means to transfer the heat from the liquid to the air media. In standard practice such as associated with a truck, for example, heated coolant is passed through a radiator and a cooling air stream is sucked through the radiator by a fan. Shroud means are employed to guide the air and improve the efficiency of the fan. Such factors as shroud exit to fan blade clearance, recirculation of the same air in the center portions, the generation of fan noises, and the required horsepower to drive the fan become critical. To the solutions of these difficulties and problems, innumerable patents have been directed. It has been discovered that there is a relation between tip clearance, driving horsepower or fan efficiency and fan noises. It is believed at this time that recirculation and turbulence in the tip region of the fan are responsible for a majority of the fan generated noises and substantially reduce the overall efficiency of the fan to move air.

It is therefore an object of this invention to provide a Coanda effect producing fan shroud means and thereby substantially reduce air recirculation and turbulence in the tip regions of the fan. It is yet another object of this invention to provide a fan shroud exit section which is capable of creating low pressure vortices when a stream of air is passed thereover. Another object of this invention is to provide an engine cooling system wherein fan generated noise and engine horsepower requirements are reduced. A further object of this invention is to provide a contoured fan shroud exit section having supplementary low pressure vortex creating pockets therein. Moreover, another object of this invention is to provide a fan shroud exit section means which promotes pressure gradient bending of a fan generated airstream passing thereover.

In accordance with this invention it has been discovered that noise generation and horsepower requirements of a fan assembly can be reduced by the provision of a fan shroud exit section which is capable of pressure gradient deflection It is believed that by pressure gradient deflecting or the achievement of the Coanda effect, fan generated air turbulence and recirculation in the tip regions of the fan are reduced and that the other results flow therefrom.

If a jet of fluid is introduced adjacent a curved or flat plate, the jet will "attach" to the plate and follow the plate even though the resultant flow path is highly divergent from the original direction of the jet. This phenomenon is the Coanda effect named after its discoverer: Henri Coanda, a Romanian engineer. The Coanda effect, it is believed, is caused by a stable dynamically formed and sustained pressure gradient across a jet, which pressure gradient bends the jet toward an adjacent boundary or surface. For example a jet issuing from a nozzle begins to entrain ambient fluid into the jet "mixing region" if the issuance of the jet is in the region of a properly designed wall, adjacent thereto entrained fluid is not easily replaced. On the opposite side of the jet, away from the adjacent wall entrained fluid is easily replaced by ambient fluid. The result is the rapid development of a transverse pressure gradient across the jet and the formation of a "bubble" or vortex which forms a region of low pressure. It is the vortex with its low pressure region, a properly designed adjacent wall, and the pressure of the ambient fluid on the opposite side of the stream that cause it to bend and thus follow the contour of the wall. For reasons yet unknown as the jet flows over the surface it entrains up to twenty times the amount of air in the original jet.

At this time there is much uncertainty as to the nature of the Coanda effect. That is to say the Coanda effect is not fully understood; however, I have determined that the provision of a fan with a Coanda effect producing fan shroud exit section causes surprising and unique results.

Other objects and advantages of the invention will become apparent upon reading the following detailed description and upon reference to the drawings, in which:

FIGS. 3 and 4 are additional embodiments which produce the low pressure vortex necessary to achieve pressure gradient bending of the associated fan generated airstream.

While the invention will be described in connection with preferred embodiments, it is understood that it is not intended to limit the invention to that embodiment. On the contrary, it is intended to cover all alternatives, modifications and equivalents as may be included within the spirit and scope of the invention as defined by the appended claims.

Figure 1:
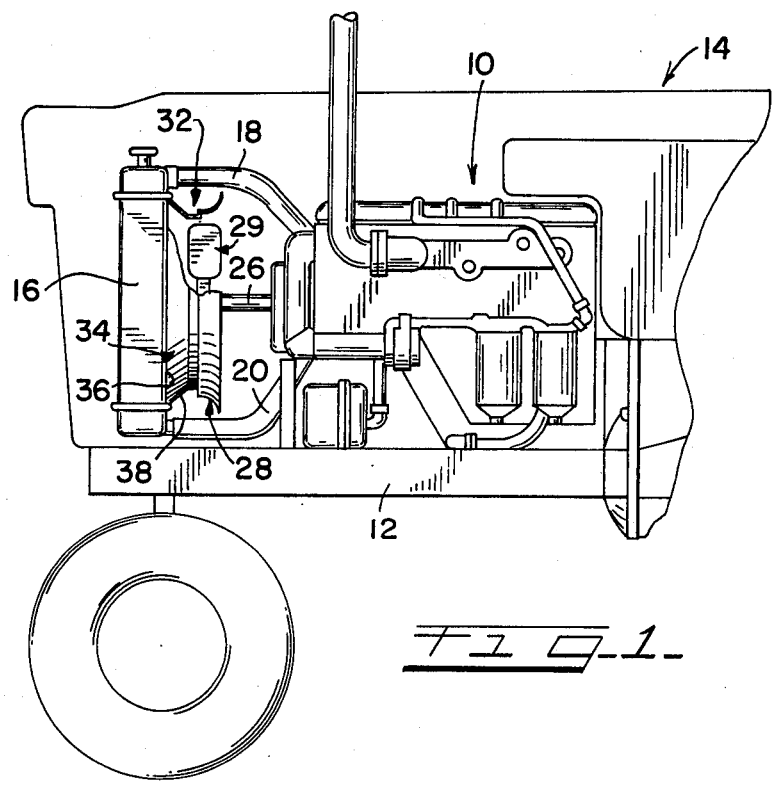
FIG. 1 is a side view of a tractor showing one embodiment of the invention.

Referring now to the drawings and, more particularly, to FIG. 1 wherein is shown an embodiment of the invention herein disclosed. A conventional liquid-cooled heat-producing internal combustion engine 10 carried forwardly on longitudinally extending, parallel side sill members 12 of vehicle 14. As shown herein of the chassis frame of a vehicle 14 is a conventional tractor. However as will hereafter become more apparent this invention can be employed with any type of vehicle having a heat-generating internal combustion engine 10 or any portable or stationary device requiring an air moving fan and fan shroud means. Mounted forwardly of the engine 10 is a liquid cooling radiator or heat exchanger means 16 employed to dissipate engine generated heat to an air media. Coolant flows between the water jacket associated with the engine and the heat exchanger 16 through a pair of fluid communicating means 18 and 20 in a conventional and well known manner. Heat from the engine 10 is absorbed into the liquid coolant such as a mixture of water and antifreeze, etc., and passed through the heat exchanger 16. The heat is then transferred to a fan generated air stream which in turn is expelled out from the shroud as it will be hereafter more fully disclosed.

level of an air circulating fan and such objective is, in the main, achieved by substantially eliminating air turbulence in the blade tip area by insuring that the air stream discharged from the fan flows in a generally smooth and relatively turbulent-free manner. It was pointed out and explained in detail in the aforementioned U.S. Pat. No. 3,872,916 that the basic phenomenon which contributes to the realization of a generally smooth and relatively turbulent-free air stream flowing from the fan is believed to be the Coanda effect generated by the passage of such fan generated air stream over the surface of the particular fan shroud disclosed in the patent. The present invention is primarily concerned with means for strengthening such Coanda effect and, hence, to further reduce the operating noise level fan and to improve the overall performance and efficiency thereof. The Coanada effect strengthening means of the present invention is dependent upon many factors including the contour or surface of the fan shroud, the radial and axial positioning of the fan with respect to the fan shroud, and the dimensions of various contoured sections of the fan shroud with respect to the dimensions of the impeller blades, and, in particular, the effective axial width (AW) of the fan impeller blades. In order to clearly understand the invention and its operation, the definition of the effective axial width (AW) of a fan impeller blade 40 as used herein will be the same as that commonly used by fan manufacturers and is that dimension measured along the rotational axis of the fan between a pair of spaced and parallel planes which are disposed substantially perpendicular to the rotational axis of the fan 29, each of which contains a point disposed, respectively, on the leading edge 54 or trailing edge 56 at the radially outermost blade tip region or portion 42 of the fan blade. Inasmuch as the fan impeller blades 40 illustrated in the drawings are of the straight sided type, as distinguished from other common fan blade designs such as tapered or curved types substantially the entire leading edge 54 happens to lie in one of the two parallel planes between which the effective axial width (AW) of the fan blade is measured and substantially the entire trailing edge 56 happens to lie in the other plane. In other words, the effective axial width (AW), as defined above, of a straight sided fan blade is substantially the same as the axial width of the fan blade whether measured at the hub region or portion 44, or at the intermediate or middle region or portion 43, or at the radially outermost tip portion or region 42 since all of such axial width measurement values are substantially the same. However, by definition, the effective axial width (AW) of a taper sided fan blade would always have to be smaller than the axial width of the fan blade as measured at the middle region 43 and considerably smaller than axial width of the fan blade as measured at the hub region of the fan blade. In a fan blade design of the tapered type, the leading edge may be tapered while the trailing edge of the blade is disposed in a plane perpendicular to the rotational axis of the fan. Alternatively, the trailing edge of the blade may be tapered and the leading edge disposed in a plane normal to the axis of rotation of the fan. In certain tapered fan blade designs, both the leading edge and the trailing edge of the blade are tapered, each of which lies substantially in a plane inclined at an angle with respect to the rotational axis of the fan which is either greater or less than 90°. However, it is to be understood that regardless of whether the fan blade design is of the straight sided, type, taper sided (one side or both) type, curved sided type, or or a hybrid version of such types, the effective axial width (AW) of the fan blade is always measured or determined as pointed out hereinbefore and preferably as also pointed out hereinbefore, the fan is axially positioned so that one of the pair of parallel planes, which are disposed substantially perpendicular to the rotational axis of the fan and are used to establish the axial limits of the effective axial width (AW) substantially passes through the juncture of the shroud entrance section 34 and the shroud exit section 28 and the other plane of such pair of parallel planes substantially coincides with the plane containing the radially expanding or radial section 58 of the shroud exit section 28.

The fan 29 is, preferably, axially positioned with respect to the fan shroud exit section 28 so that the juncture of the shroud entrance section 34 and the shroud exit section 28 lies substantially in the plane perpendicular to the rotational axis of the fan 29 and containing the leading edges 54 of the fan blades 40 (since the fan blades illustrated are of the straight sided type) or in one of the two parallel planes defining the limits or axial length of the effective axial width (AW) of the fan blades. It is also preferable to dimension and position the fan blades 40 in such a manner that the plane containing the trailing edges 56 or the other plane of the two parallel planes defining the limits of the effective axial width (AW) also contains the rearwardmost radially extending portion 58 of the shroud exit section 28.

Additionally, it is preferable to dimension the various sections such as the throat section 46, curved section 48 and radial section 58 comprising the fan shroud exit section 28 in accordance with the disclosure of the aforementioned U.S. Pat. No. 3,872,916. Thus, for achieving optimum results CF should have a value of approximately AW/3, R should be substantially 2AW/3, and RF should have a value of approximately AW/3. It should be understood, however, that these respective spatial relations and fan shroud section sizes can vary up to a distance equal to plus or minus twelve percent of the effective axial width (AW) of the fan blade. In other words, the juncture of the shroud entrance section 34 and the shroud exit section 28 can be axially spaced or offset a distance of 0.12 (AW) from the plane containing the leading edges 54 of the fan blades without departing from the spirit and scope of the invention. Similarly, the plane containing the fan blade trailing edges 56 may be axially spaced the same amount from the plane containing the rearwardmost radially extending portion of the shroud exit section 28. Furthermore, RF could have a value of AW/3 plus or minus the amount of 0.12 AW, or R could have a value of 2AW/3 plus or minus the amount of 0.12 AW, or RF could have a value of AW/3 plus or minus the amount of 0.12 AW without departing from the spirit and scope of the invention.

Figure 2:
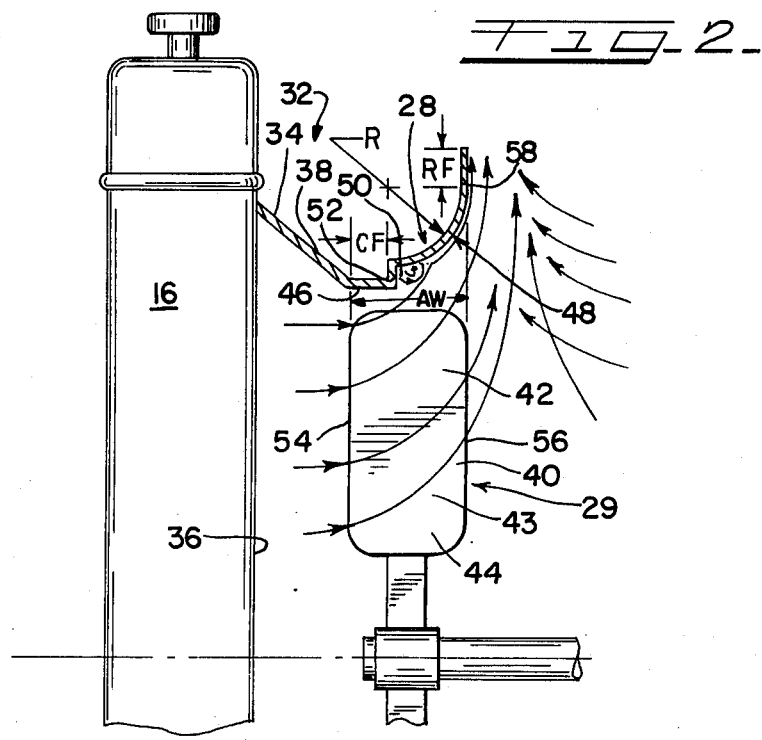
FIG. 2 is a partially broken away side sectional view of the radiator fan shroud shroud exit section which forms a region of low pressure.

The particular embodiment of the exit shroud section 28 shown in FIG. 3 again has the fan 29 axially located with respect thereto so as to be substantially in radial alignment therewith as in the embodiment of the invention illustrated in FIG. 2. However, the exit shroud 28 is formed in such a manner that the annular curved section 48 is in effect a direct continuation of the throat section 46 while the supplementary low pressure vortex creating means 50 is located at the juncture of curved section 48 and the radially expanding section 58. As shown the supplementary low pressure vortex creating means 50 is again in the form of an axially extending step or offset 52', which, in effect, axially offsets the radially expanding section 58 from the radially outermost end of the curved section 48. Thus, an annular low pressure vortex creating pocket or groove is provided between the radially outermost end of the annular curved section 48 and the radially innermost end of the radially expanding section 58 step. In the particular embodiment shown in FIG. 4 the low pressure vortex creating means 50 takes the form of a bend 52 located generally between the ends of and the smooth curve section 48.

From the foregoing, it will be appreciated that in each of the embodiments of the invention described, supplementary low pressure vortex creating means are incorporated into the unique fan shroud design disclosed in U.S. Pat. No. 3,872,916 for strengthening the Coanda effect generated by the passage of fan generated air over such patented fan shroud design and thereby improve the overall performance characteristics of the patented fan shroud design. It is to be understood, however, that the particular form the supplementary low pressure vortex creating means takes and its location in the fan shroud exit section are immaterial as far as the scope of the invention as concerned.

Thus it is apparent that there has been provided, in accordance with the invention, a heat transfer system that fully satisfies the objects, aims, and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A fan shroud structure for use with a rotary, axial flow fan having a plurality of circumferentially spaced, radially extending impeller blades, said blades having an effective axial width (AW) measured axially along the rotational axis of the fan between a first plane and a second plane, said planes being axially spaced and parallel with respect to each other and disposed substantially normal to the rotational axis of the fan, said first and second planes extending radially, respectively through points on the leading edges of the blades at the radial tip portions thereof and through points on the trailing edges of the blades at the radial tip portions thereof, the combination including said fan, comprising,
   a generally cylindrical axially extending throat section encircling the fan;
   an annular generally radially extending flat portion, said flat portion being radially spaced outwardly and axially from one axial end of said throat section;
   an annular intermediate section extending between said one axial end of said throat section and said radial flat portion, said throat section, intermediate section, and said radial flat portion being effective to produce a low pressure region between the air stream flowing over the surface thereof and such surface when the fan is in operation; and
   an annular supplementary low pressure vortex creating means formed in said throat section, intermediate section and radial flat portion of the fan shroud structure whereby an additional low pressure region is generated between the air stream flowing over the surface of the fan shroud structure and such fan shroud structure surface when the fan is in operation.

2. A fan shroud structure as set forth in claim 1, wherein said throat section, flat portion, and intermediate section have an overall axial length measured along the rotational axis of the fan substantially equal to AW plus or minus 25 percent of AW.

3. A fan shroud structure as set forth in claim 1, wherein said fan is axially positioned with respect to said intermediate section so that said second plane is substantialy coincident with the radial plane containing the end of said intermediate section opposite the end thereof operatively connected to said one axial end of said throat section.

4. A fan shroud structure as set forth in claim 1, wherein said fan is axially positioned with respect to said throat section so that said first plane is substantially coincident with the radial plane containing one axial end of said throat section.

5. A fan shroud structure as set forth in claim 1, wherein said fan is axially positioned with respect to said throat section, intermediate section, and flat portion so that said first plane is axially spaced from and on either axial side of said radial plane containing said one axial end of said throat secton a distance of 0 to 12 percent of AW and said second plane is axially spaced from and on either axial side of said radial plane containing said end of said intermediate section opposite the end thereof operatively connected to said throat section a distance of 0 to 12 percent of AW.

6. A fan shroud structure as set forth in claim 5, wherein said supplementary low pressure vortex creating means is disposed adjacent the intersection of said throat section and said intermediate section.

7. A fan shroud structure as set forth in claim 5, wherein said supplementary low pressure vortex creating means is disposed adjacent the intersection of said intermediate section and said radial flat portion.

8. A fan shroud structure as set forth in claim 5, wherein said supplementary low pressure vortex creating means is disposed intermediate the axial ends of said intermediate section.

9. A fan shroud structure for use with a rotary, axial flow fan having a plurality of circumferentially spaced, radially extending impeller blades, said blades having an effective axial width (AW) measured axially along the rotational axis of the fan between a first plane and a second plane, said planes being axially spaced and parallel with respect to each other and disposed substantially normal to the rotational axis of the fan, said first and second planes extending radially, respectively, through points on the leading edges of the blades of the radial tip portions thereof and through points on the trailing edges of the blades at the radial tip portions thereof, comprising,
   a generally cylindrical axially extending throat section encircling the fan;
   an annular, generally radially extending flat portion, said flat portion being radially spaced outwardly and axially from one axial end of said throat section;
   an annular, radially and axially curved, intermediate section extending between said one end of said throat section and said radial flat portion, said throat section, intermediate section, and said radial flat portion being effective to produce a low pressure region between the air stream flowing over the surface thereof and such surface when the fan is in operation, and the following relationships exist: RF = AW/3 plus or minus 12 percent of AW, CF = AW/3 plus or minus 12 percent of AW, and R = 2AW/3 plus or minus 12 percent of AW where RF is the radial length of the radial flat portion, CF is the axial length of the cylindrical throat section, and R is the radius of curvature of the intermediate section; and an annular supplementary low pressure vortex creating means formed in said throat and intermediate section, and radial flat portion of the fan shroud structure such that an additional low pressure region is generated between the air stream flowing over the surface of the fan shroud structure and such fan shroud structure surface when the fan is in operation.

10. A fan shroud structure as set forth in claim 9, wherein said supplementary low pressure vortex creating means is disposed adjacent the intersections of said throat section and said intermediate section.

11. A fan shroud structure as set forth in claim 9, wherein said supplementary low pressure vortex creating means is disposed adjacent the intersection of said intermediate section and said radial flat portion.

12. A fan shroud structure as set forth in claim 9, wherein said supplementary low pressure vortex creating means is disposed intermediate the axial ends of said intermediate section.

13. A fan shroud structure for use with a rotary, axial flow fan having a plurality of circumferentially spaced, radially extending impeller blades, said blades having an effective axial width (AW) measured axially along the rotational axis of the fan between a first plane and a second plane, said planes being axially spaced and parallel with respect to each other and disposed substantially normal to the rotational axis of the fan, said first and second planes extending radially, respective, through points on the leading edges of the blades at the radial tip portions thereof and through points on the trailing edges of the blades at the radial tip portions thereof, comprising, a generally cylindrical, axially extending throat section encircling the fan, said first plane being substantially coincident with the radial plane containing one axial end of said throat section;

an annular, generally radially extending flat portion, said flat portion being radially spaced outwardly and axially from the other axial end of said throat section;

an annular intermediate section extending between said other axial end of said throat section and said radial flat portion, said throat section, intermediate section, and said radial flat portion being effective to produce a low pressure region between the air stream flowing over the surface thereof and such surface when the fan is in operation, said intermediate section being radially and axially curved, and the following relationships exist: RF = AW/3 plus or minus 12 percent of AW, CF = AW/3 plus or minus 12 percent of AW, and R = 2AW/3 plus or minus 12 percent of AW where RF is the radial length of the radial flat portion, CF is the axial length of the cylindrical throat section, and R is the radius of curvature of the intermediate section, and said first plane may be axially spaced from and on either axial side of radial plane containing said one axial end of said throat section a distance of 12 percent of AW and said second plane may be axially spaced from and on either axial side of a radial plane containing said end of said intermediate section opposite the end thereof operatively connected to said throat section a distance of 12 percent of AW; and an annular supplementary low pressure vortex creating means formed in said throat and intermediate sections, and radial flat portion of the fan shroud structure whereby an additional low pressure region is generated between the air stream flowing over the surface of the fan shroud structure and such fan shroud structure surface when the fan is in operation.

14. A fan shroud structure as set forth in claim 13, wherein said supplementary low pressure vortex creating means is disposed adjacent the intersection of said throat section and said intermediate section and includes an annular, radially extending step operatively connected to and extending radially outwardly from one axial end of said throat section, said step being operatively connected to one end of said intermediate section.

15. A fan shroud structure as set forth in claim 13, wherein said supplementary low pressure vortex creating means is disposed adjacent the intersection of said intermediate section and said radial flat portion and includes an annular, axially extending step operatively connected to and extending axially toward said throat section from the radially outermost end of said intermediate section, said step being operatively connected to the radially innermost end of said radial flat portion.

16. A fan shroud structure as set forth in claim 13, wherein said supplementary low pressure vortex creating means is disposed intermediate the axially spaced ends of said intermediate section and includes an annular, concave groove formed in the surface of said intermediate section over which the air stream flows when the fan is in operation.

* * * * *